S. H. GOLDBERG.
MACHINE FOR MAKING HAIRPINS OR SIMILAR ARTICLES.
APPLICATION FILED FEB. 10, 1919. RENEWED JAN. 23, 1922.
1,424,473.
Patented Aug. 1, 1922.
5 SHEETS—SHEET 4.
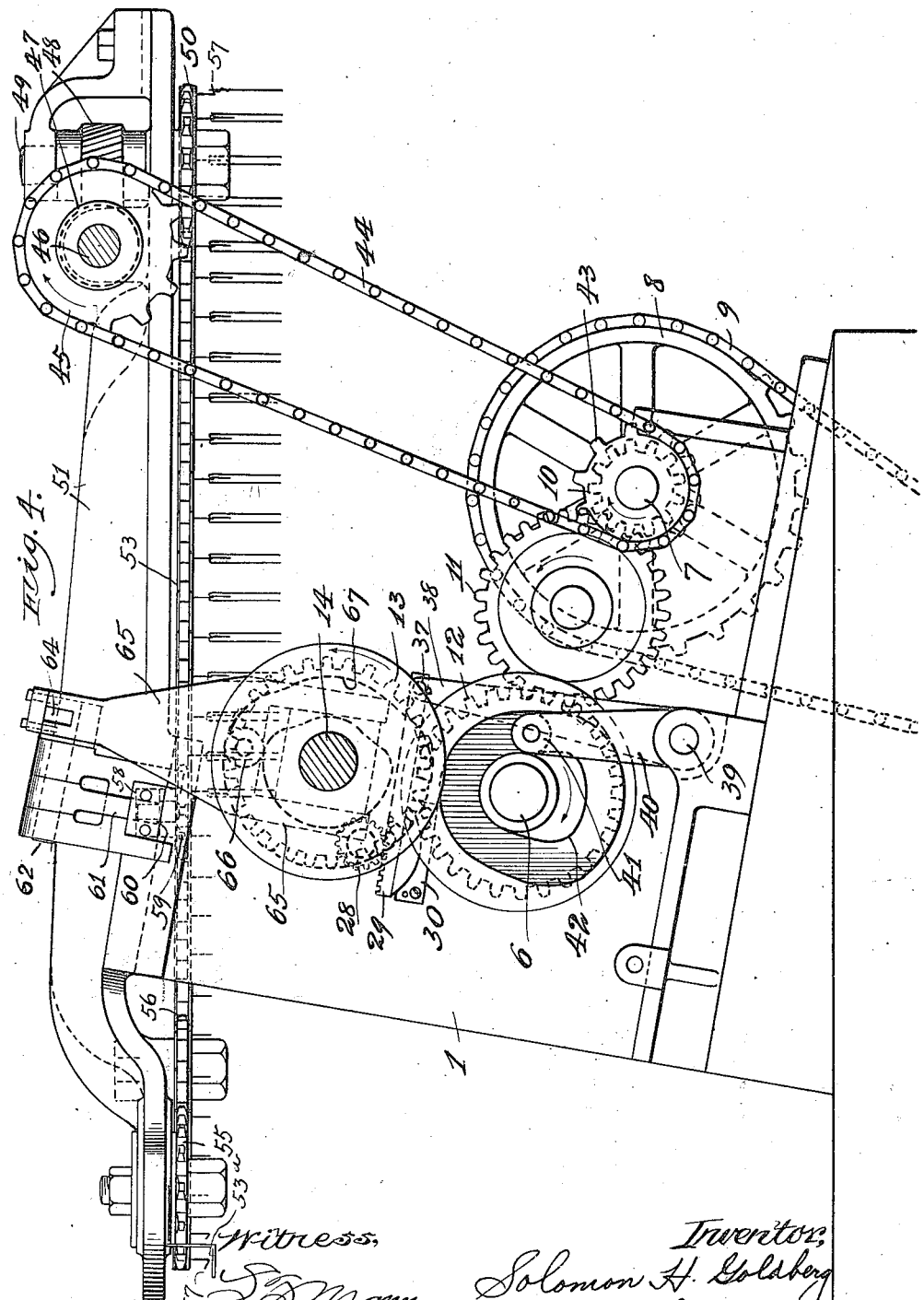

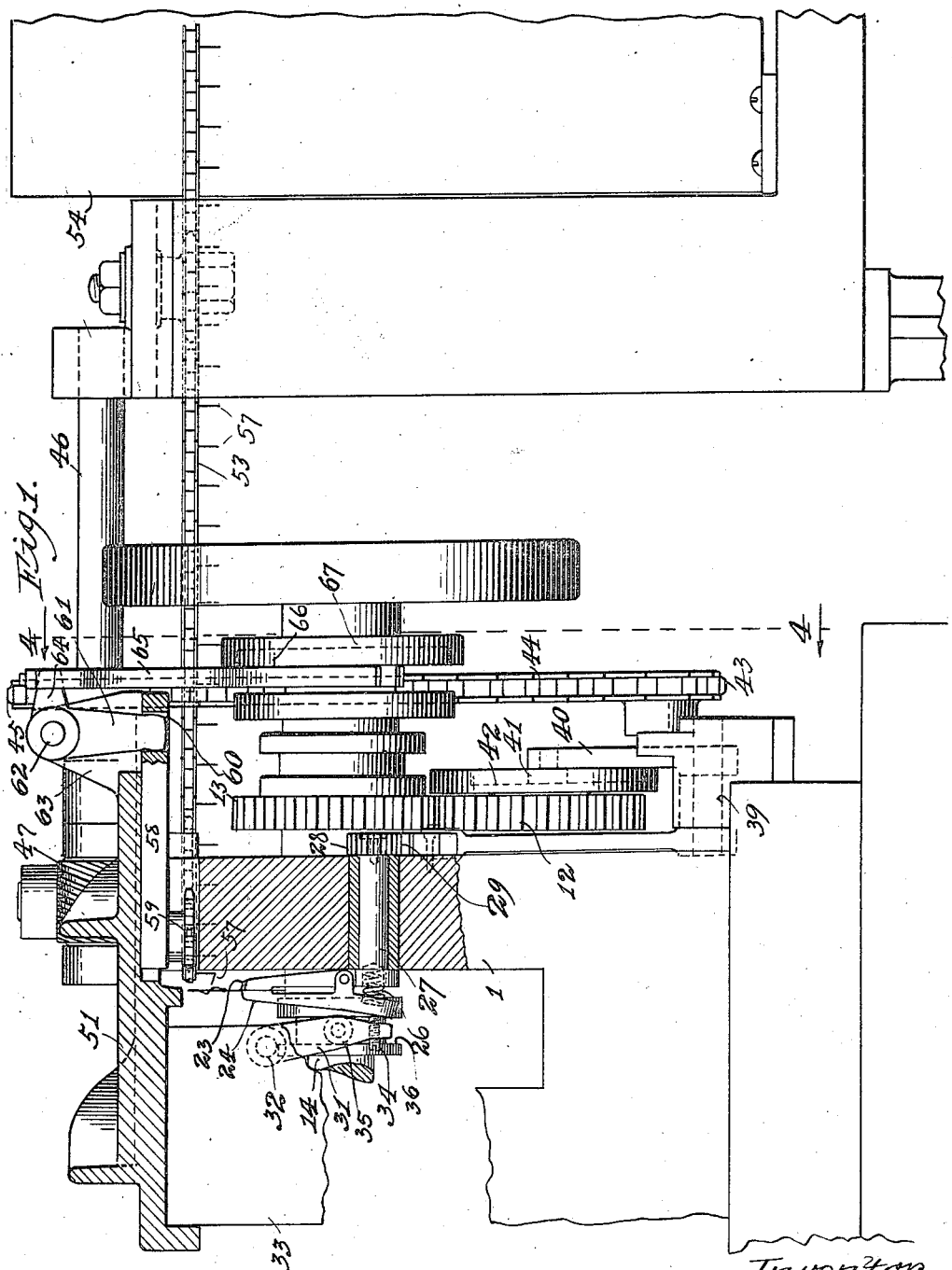

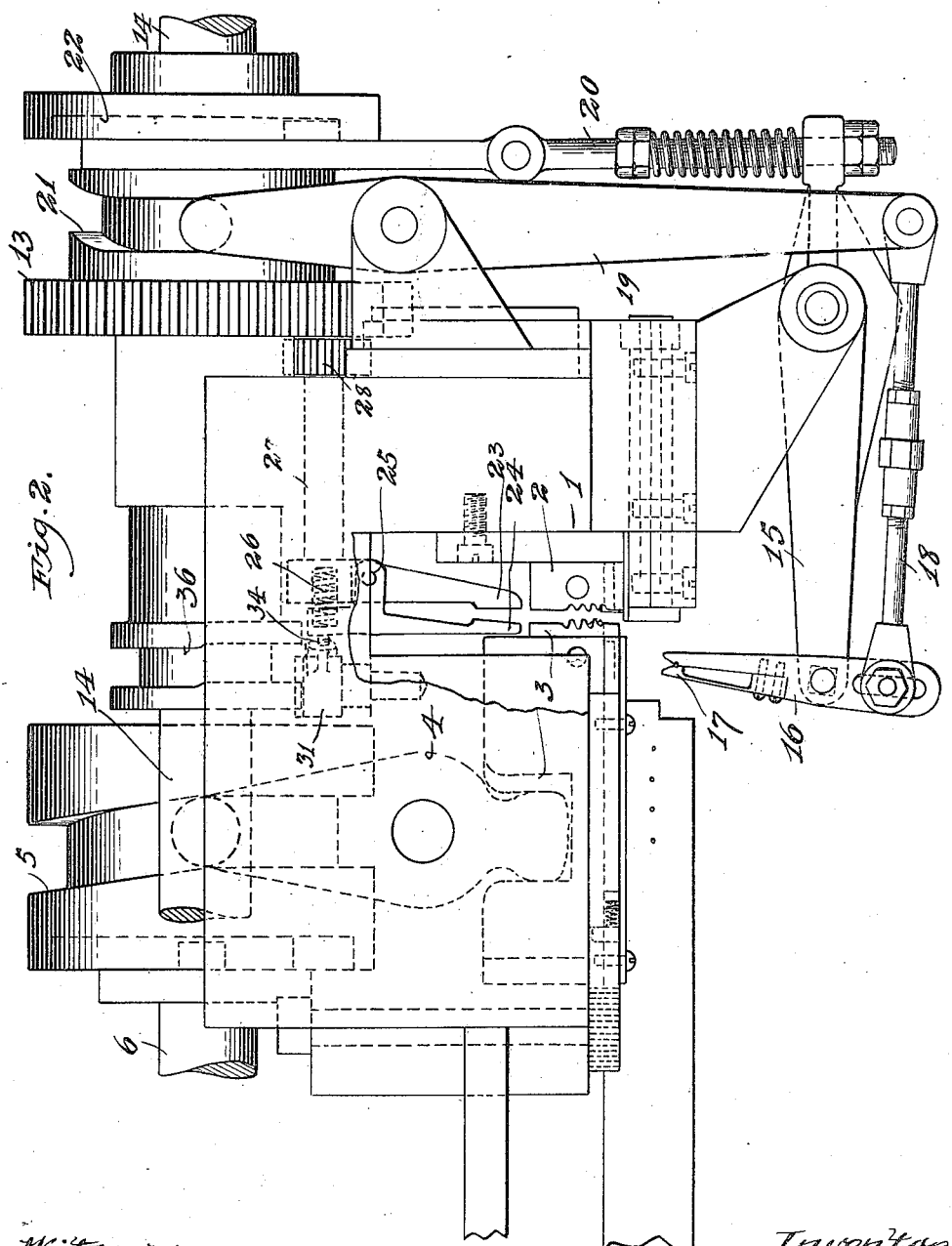

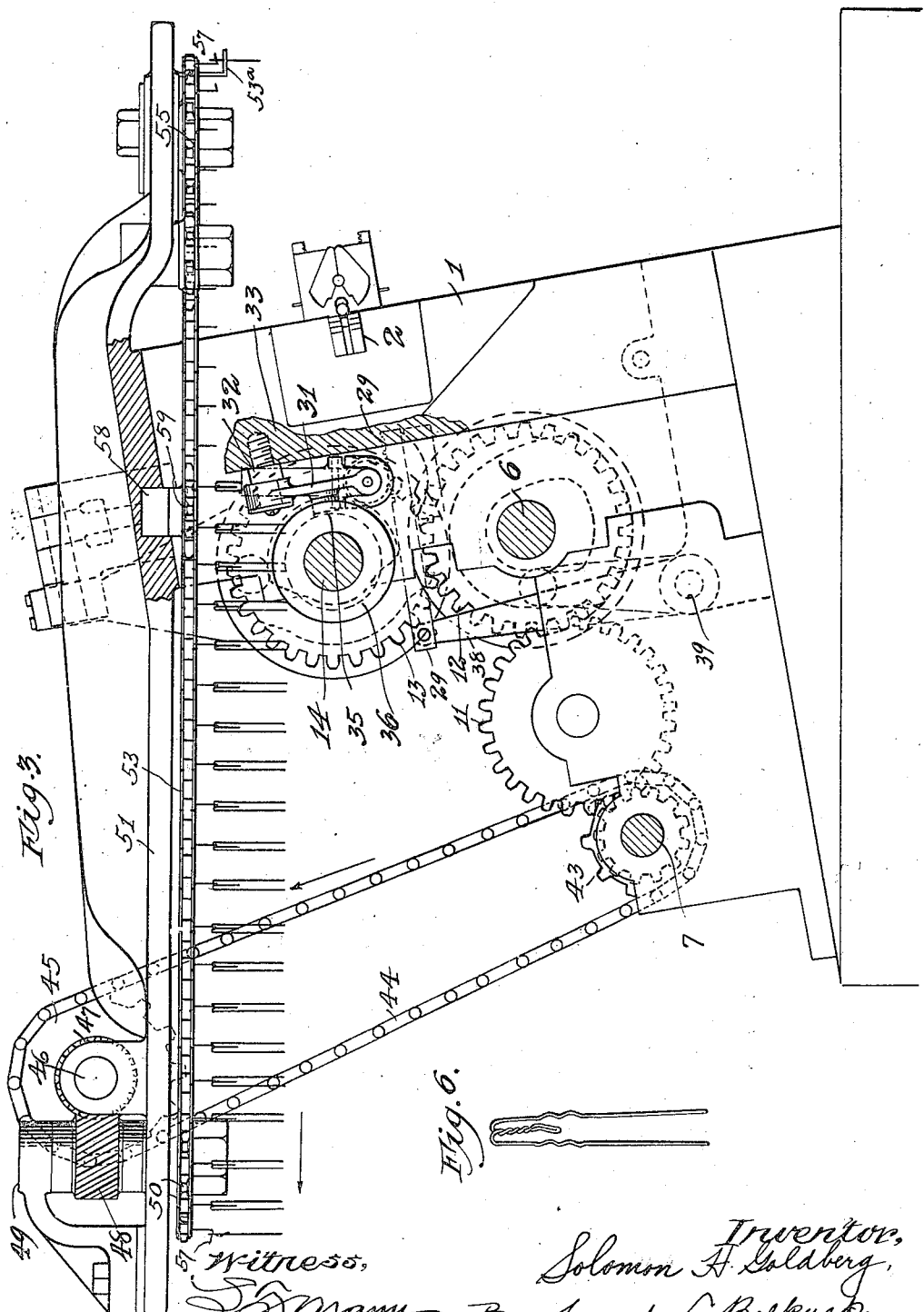

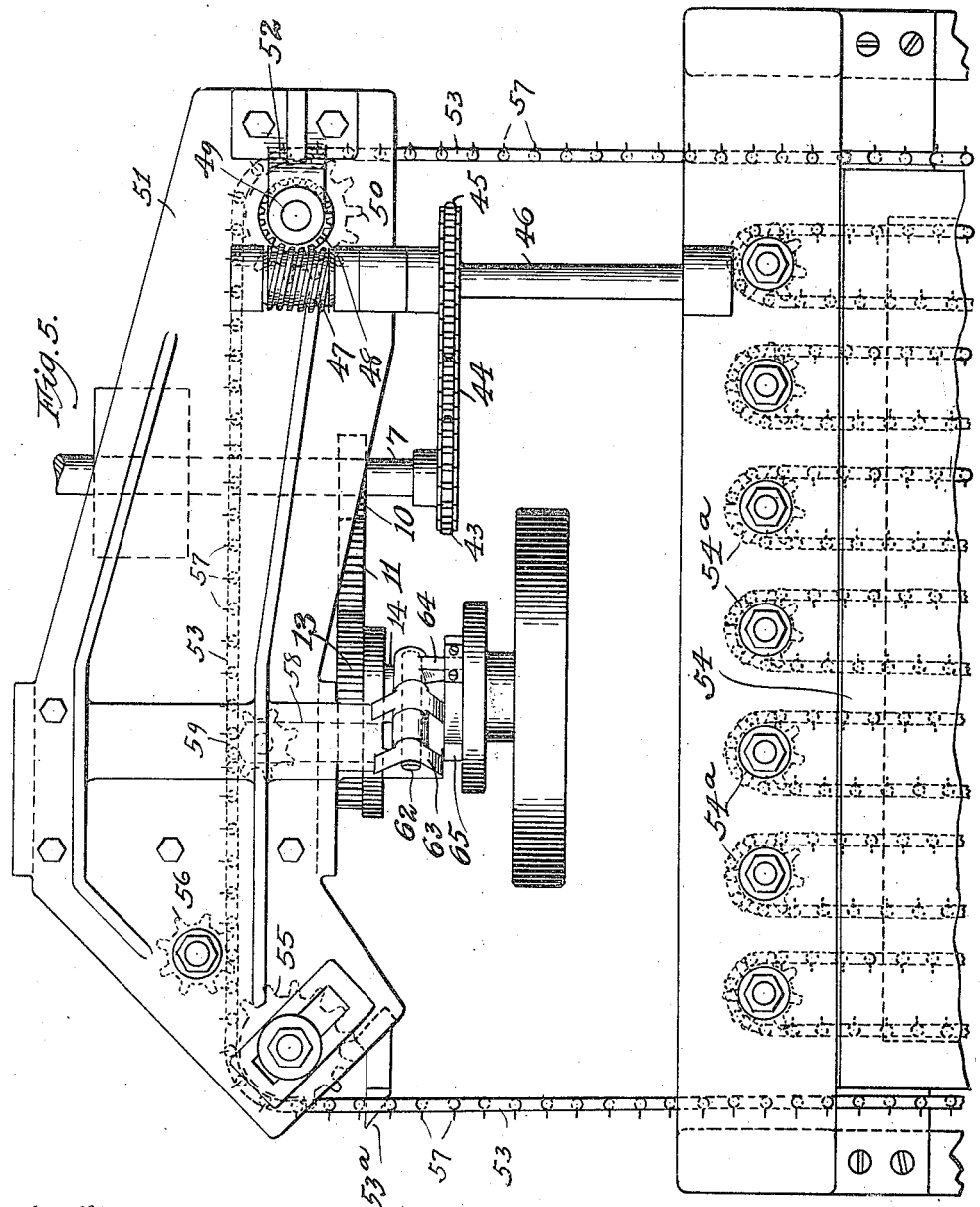

UNITED STATES PATENT OFFICE.

SOLOMON H. GOLDBERG, OF CHICAGO, ILLINOIS.

MACHINE FOR MAKING HAIRPINS OR SIMILAR ARTICLES.

1,424,473.  Specification of Letters Patent.  Patented Aug. 1, 1922.

Application filed February 10, 1919, Serial No. 276,010. Renewed January 23, 1922. Serial No. 531,311.

*To all whom it may concern:*

Be it known that I, SOLOMON H. GOLDBERG, a citizen of the United States, residing in the city of Chicago, county of Cook, and State of Illinois, have invented certain new and useful Improvements in Machines for Making Hairpins or Similar Articles, of which the following is a specification.

This invention relates to a new and improved machine for making hairpins or similar articles, and relates particularly to mechanisms for transferring the completely formed hair pin from the final forming dies in the machine to an endless conveyor belt whereby the pins are caused to travel through a japanning oven or other finishing or handling apparatus.

Among the salient objects of the invention are to provide improved mechanism whereby the completely formed pins are each successively and automatically grasped, elevated, and applied to a continuously advancing conveyor whereby they are further brought into and carried through a japanning and drying oven and finally released from the conveyor. The improvements embodied in the invention render the production of hairpins at a reduced cost by reason of saving power, labor, and time.

In the drawings:

Fig. 1 is a front elevation of part of a machine for making hairpins, with parts broken away, other parts in section and parts omitted for clearness of illustration and also a part of a japanning oven with connecting mechanisms between the hairpin machine and japanning oven.

Fig. 2 is a plan view of part of a machine for making hairpins, parts being broken away, and parts being omitted for the sake of clearness.

Fig. 3 is a transverse sectional elevation with parts omitted and parts broken away and also showing part of the conveying mechanism related thereto.

Fig. 4 is a transverse sectional view with parts omitted for the sake of clearness, taken on line 4—4 of Fig. 1, looking in the direction of the arrows.

Fig. 5 is a plan view of part of a japanning oven and part of the end of a hairpin machine showing the gearing and connecting parts between them.

Fig. 6 is a detail view of a hairpin.

The hairpin produced by the machine may be of any desired size and form but in the machine shown the hairpins are of the variety shown in the detailed illustration and need no particular description.

After passing through the initial cutting and forming parts of the machine (not shown), the pin sections are presented to final forming and crimping blocks or jaws, and are in the present machine transferred therefrom to a conveyor belt which is continuously driven in timed relation to the hair pin machine so that each finished pin is automatically placed on the conveyor belt and travels therewith until the pin has traversed the entire distance required to subject it to the treatment required for japanning and drying. When the japanning and drying has been accomplished, the pin is removed from the conveyor.

Mounted on the end frame 1 is a fixed crimping block 2 against which the movable crimping block 3 acts to fix the corrugations or crimp in the pin. The movable crimping block 3 is actuated by pivoted lever 4 and cam 5 on shaft 6. Shaft 7 is driven through sprocket wheel 8 and chain 9 from a source of power not shown. Pinion 10 on shaft 7, meshes with idler 11 which in turn meshes with gear 12 on shaft 6. Through gear 13 meshing with gear 12 the shaft 14 is driven. The pick up mechanism for presenting the pin blanks to the forming and crimping blocks comprises a pivoted arm 15 supporting a pivoted cross arm 16 which cross arm is provided with a spring jaw 17 to engage the pin blank and has pivotally and adjustably secured to its outer end a rod 18. Arm 15 and rod 18 are operated through pivoted arm 19 and spring cushioned arm 20 respectively engaged by cam 21 and cam 22 on shaft 14.

When the crimping blocks act upon the pin to form the creasing or crimping thereon, gripping jaws 23 and 24 are brought into engagement with the legs of the pin in the following manner. Jaw 23 and jaw 24 are pivoted to each other at 25 and have interposed between them a coiled spring 26, which spring normally causes the jaws to assume a closed position with relation to each other. The jaw 23 is fixed to the shaft 27 journaled in the end frame 1 and said shaft has a pinion 28, meshing with a rack bar 29, said rack bar being slidable on the block 30. Arm 31 is pivoted at 32 to the face plate 33, and has in one end an adjusting screw 34 for contacting the jaw 24 and is provided with a roller 35 engaging the cam 36 on shaft 14 whereby the arm is caused to rock on its pivot and release the jaw 24, causing the jaw 24 to engage the legs of the hairpin and by reason of the expansion spring 26 grip the pin firmly between the jaws. Rack bar 29 is pivoted at 37 to a crank arm 38 on the crank shaft 39. The crank shaft is also provided with a crank arm 40 which crank arm has a roller 41 engaging the internal cam 42 on the shaft 6. Through the above described connections it will be readily understood that the shaft 27 will be rocked in its bearing and cause the jaws 23 and 24 to move from a horizontal to a vertical position carrying with them the hairpin.

Referring now to the conveyor and its associated mechanisms, sprocket 43 on shaft 7 through chain 44 and sprocket wheel 45 imparts rotary movement to shaft 46, and worm gear 47 on shaft 46, meshing with worm gear 48 on stub shaft 49, imparts rotary movement to sprocket wheel 50 on the lower end of shaft 49, which shaft is journaled in frame 51, and bracket 52. Conveyor chain 53 leads over sprocket wheel 50, and passes into the japanning oven 54, passing forward and backward over suitable guiding sprocket pinions 54ᵃ and finally passing over sprocket wheel 55, past idler 56 on frame 51.

The conveyor chain is provided with hooks 57 on which the hairpins are suspended. When the hairpins have been elevated from a horizontal to an upright position as previously described the conveyor chain will be flexed or pushed outwardly at the point where the hairpin is about to be released from the gripping jaws, bringing the hook on the chain forward and between the legs of the hairpin. This forward movement of the conveyor chain is accomplished by the following action:

Plate 58 is slidably secured in the frame 51 and has mounted on its under side a sprocket pinion 59, which pinion engages the conveyor chain. In the outer end of plate 58 is an aperture 60 in which projects the lug 61 on rock shaft 62 which rock shaft is pivoted in the lugs 63 on the frame 51. The other lug 64 on rock shaft 62 extends into engagement with a frame plate 65 which plate has a roller 66 engaging the internal cam 67 on shaft 14.

As the chain is pressed forward by the action of the mechanisms just described the gripping jaws release the hairpin and allows the hook to carry the pin forward, advancing it through the japanning and drying oven, and finally releasing the pin from the hook by causing the pin to impinge the fixed cam plate 53ᵃ.

It is believed the action of the machine will be understood without further detailed description, as all the separate mechanisms are assembled with exact regard to time.

While I have shown and described in detail certain mechanisms, adjustments, etc., the invention is not limited to such features except as set forth in the following claims.

I claim as my invention:

1. In a machine for forming hairpins or similar articles the combination with a continuously driven pin forming machine, of a continuously advancing conveyor chain, means for holding the pins on the chain and means whereby the chain is caused to be flexed to receive the hairpins.

2. In a machine for forming hairpins or similar articles the combination with a continuously driven pin forming machine of means for transferring the pin from the final forming dies, comprising cam actuated spring controlled jaws to receive the pin, a continuously advancing conveyor belt and hooks on the belt upon which the pins are delivered, and means whereby the conveyor belt is flexed into position to receive a hairpin.

3. In a machine for forming hairpins or similar articles, the combination with a continuously driven pin forming machine of means for transferring the pin from the final forming dies, comprising cam actuated spring controlled jaws to receive the pin and a continuously advancing conveyor belt and hooks on the belt upon which the pins are delivered and an idler wheel slidably mounted whereby the wheel is caused to engage and flex the conveyor to position the hook thereon to receive the pin.

4. In a machine for forming hairpins or similar articles, the combination with a continuously driven pin forming machine, of means for transferring the pin from the final forming dies, comprising cam actuated spring controlled jaws to receive the pin and a continuously advancing conveyor belt and hooks on the belt upon which the pins are delivered, an idler wheel slidably mounted whereby the wheel is caused to engage and flex the conveyor to position the hook thereon to receive the pin, and cam actuated mechanism whereby the idler and conveyor are advanced and retracted.

SOLOMON H. GOLDBERG.